(12) United States Patent
Tsujibayashi et al.

(10) Patent No.: US 11,535,060 B2
(45) Date of Patent: Dec. 27, 2022

(54) HEAVY DUTY PNEUMATIC TIRE

(71) Applicant: SUMITOMO RUBBER INDUSTRIES, LTD., Hyogo (JP)

(72) Inventors: Satoko Tsujibayashi, Hyogo (JP); Yoshiyuki Takada, Hyogo (JP); Satoshi Tanaka, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 82 days.

(21) Appl. No.: 17/036,488

(22) Filed: Sep. 29, 2020

(65) Prior Publication Data

US 2021/0107316 A1 Apr. 15, 2021

(30) Foreign Application Priority Data

Oct. 11, 2019 (JP) .............................. JP2019-187502

(51) Int. Cl.
*B60C 11/00* (2006.01)
*B60C 11/13* (2006.01)
(Continued)

(52) U.S. Cl.
CPC ............ *B60C 11/0058* (2013.01); *B60C 9/28* (2013.01); *B60C 11/0083* (2013.01);
(Continued)

(58) Field of Classification Search
CPC ............... B60C 11/0058; B60C 11/066; B60C 11/1346
See application file for complete search history.

(56) References Cited

U.S. PATENT DOCUMENTS 7,878,228 B2 * 2/2011 Ito ........................... B60C 11/12
152/DIG. 3
2004/0069392 A1 * 4/2004 Maruoka ................... B60C 3/04
152/209.1
(Continued)

FOREIGN PATENT DOCUMENTS

JP 08034205 A * 2/1996 ......... B60C 11/1346
JP 11078413 A * 3/1999 ........... B60C 1/0016
(Continued)

OTHER PUBLICATIONS

Machine Translation: JP-2009096255-A.,Tanaka Y, (Year: 2022).*
Machine Translation: JP-11078413-A, Matsumoto H, (Year: 2022).*
Machine Translation: JP-08034205-A, Kawahara T, (Year: 2022).*

*Primary Examiner* — Kendra Ly (74) *Attorney, Agent, or Firm* — Greenblum & Bernstein, P.L.C.

(57) ABSTRACT

A heavy duty pneumatic tire in which occurrence of uneven wear is inhibited is provided. In the tire, each shoulder land portion includes a groove wall portion forming a wall of a shoulder circumferential groove, and a cap portion located outward of the groove wall portion in an axial direction. A wear resistance index of the groove wall portion is lower than a wear resistance index of the cap portion. A ratio of a distance in the axial direction from an outer edge of the shoulder circumferential groove to a boundary between the groove wall portion and the cap portion on an outer surface of the shoulder land portion, to a width in the axial direction of the shoulder land portion, is not less than 20% and not greater than 30%.

12 Claims, 4 Drawing Sheets

(51) Int. Cl.
 *B60C 9/28* (2006.01)
 *B60C 11/03* (2006.01)
(52) U.S. Cl.
 CPC ... *B60C 11/1346* (2013.01); *B60C 2011/0033* (2013.01); *B60C 2011/0355* (2013.01); *B60C 2011/1361* (2013.01); *B60C 2200/06* (2013.01)

(56) References Cited

U.S. PATENT DOCUMENTS

| | | | |
|---|---|---|---|
| 2007/0151646 A1* | 7/2007 | Ito | B60C 11/12 152/DIG. 3 |
| 2010/0269967 A1* | 10/2010 | Maruoka | B60C 9/2006 152/209.16 |
| 2014/0332133 A1* | 11/2014 | Atake | B60C 11/0083 152/209.15 |
| 2015/0057391 A1* | 2/2015 | Kang | C08L 9/06 523/156 |
| 2018/0281523 A1* | 10/2018 | Hamanaka | B60C 9/2006 |

FOREIGN PATENT DOCUMENTS

| | | | | |
|---|---|---|---|---|
| JP | 2005-053258 A | | 3/2005 | |
| JP | 2009-096255 A | | 5/2009 | |
| JP | 2009096255 A | * | 5/2009 | |
| WO | WO-9937489 A1 | * | 7/1999 | B60C 11/00 |

* cited by examiner

HEAVY DUTY PNEUMATIC TIRE

BACKGROUND OF THE INVENTION

Field of the Invention

The present invention relates to a heavy duty pneumatic tire.

Description of the Background Art

Due to running, uneven wear may occur in the tread of a tire. For example, a heavy load acts on a heavy duty pneumatic tire mounted on a vehicle such as a truck or a bus. Thus, uneven wear is likely to occur in this tire. Therefore, various studies have been conducted in order to inhibit occurrence of uneven wear (for example, Japanese Laid-Open Patent Publication No. 2009-96255 and Japanese Laid-Open Patent Publication No. 2005-53258).

In a tire having a plurality of land portions formed in a tread so as to be aligned in the axial direction, particularly, in the case where the tire is mounted on the front axle of a vehicle, shoulder wear tends to occur at a land portion located on the outer side in the axial direction, that is, at a shoulder land portion.

Uneven wear not only affects the appearance of a tire, but also affects the running performance of the tire, since the uneven wear changes the contact pressure distribution, etc., of the tire. Therefore, when uneven wear occurs, there is a concern that the timing of tire replacement will become earlier. Establishment of a technology that can control wear such that the entire shoulder land portion is uniformly worn is desired.

The present invention has been made in view of the above circumstances, and an object of the present invention is to provide a heavy duty pneumatic tire in which occurrence of uneven wear is inhibited.

SUMMARY OF THE INVENTION

A heavy duty pneumatic tire according to an aspect of the present invention includes: a tread having a tread surface that comes into contact with a road surface; and a belt located radially inward of the tread. Shoulder circumferential grooves extending in a circumferential direction are formed on the tread, thereby forming shoulder land portions each including an end of the tread surface and middle land portions located inward of the shoulder land portions in an axial direction. Each of the shoulder land portions includes a groove wall portion forming a wall of the shoulder circumferential groove, and a cap portion located outward of the groove wall portion in the axial direction. Regarding wear resistance indexes of the groove wall portion and the cap portion obtained by the improved Lambourn abrasion test specified in JIS K6264-2, the wear resistance index of the groove wall portion is lower than the wear resistance index of the cap portion. A ratio of a distance in the axial direction from an outer edge of the shoulder circumferential groove to a boundary between the groove wall portion and the cap portion on an outer surface of the shoulder land portion, to a width in the axial direction of the shoulder land portion, is not less than 20% and not greater than 30%.

Preferably, in the heavy duty pneumatic tire, a ratio of a distance in the axial direction from a wall of the shoulder circumferential groove to the boundary between the groove wall portion and the cap portion at a position at which a depth of the shoulder circumferential groove is half, to the width in the axial direction of the shoulder land portion, is not less than 10% and not greater than 20%.

Preferably, in the heavy duty pneumatic tire, a ratio of the wear resistance index of the groove wall portion to the wear resistance index of the cap portion is not less than 75% and not greater than 85%.

Preferably, in the heavy duty pneumatic tire, a middle circumferential groove located inward of each shoulder circumferential groove in the axial direction and extending in the circumferential direction is formed on the tread, thereby forming a crown land portion located inward of the middle land portion in the axial direction. A ratio of a thickness of the tire at a bottom of the middle circumferential groove to a thickness of the tire at a bottom of the shoulder circumferential groove is not less than 1.0 and not greater than 1.3.

Preferably, in the heavy duty pneumatic tire, an outer surface shape of the crown land portion is represented by a circular arc having a radius Rc, and an outer surface shape of the shoulder land portion is represented by a circular arc having a radius Rs. A ratio of the radius Rc of the circular arc representing the outer surface shape of the crown land portion, to the radius Rs of the circular arc representing the outer surface shape of the shoulder land portion, is not less than 1.7 and not greater than 2.3.

Preferably, in the heavy duty pneumatic tire, the belt includes a plurality of layers laminated in a radial direction, and the layers include a first reference layer having a largest width in the axial direction, and a second reference layer laminated on an outer side of the first reference layer in the radial direction. An end of a contact surface between the first reference layer and the second reference layer is located between an end of the second reference layer and a center of a groove width of the shoulder circumferential groove in the axial direction, and a distance in the axial direction from the end of the contact surface to the center of the groove width of the shoulder circumferential groove is not less than 5 mm.

Preferably, in the heavy duty pneumatic tire, a ratio of the width in the axial direction of the shoulder land portion to a width in the axial direction of the tread surface is not less than 16% and not greater than 22%.

Preferably, the heavy duty pneumatic tire has a nominal aspect ratio of 70% or less.

In the heavy duty pneumatic tire according to the present invention, the entire shoulder land portion is worn uniformly. In this tire, occurrence of uneven wear is inhibited.

DESCRIPTION OF THE PREFERRED EMBODIMENTS

Hereinafter, the present invention will be described in detail based on preferred embodiments with appropriate reference to the drawings.

In the present invention, a state where a tire is mounted on a normal rim, the internal pressure of the tire is adjusted to a normal internal pressure, and no load is applied to the tire is referred to as a normal state. In the present invention, unless otherwise specified, the dimensions and angles of each component of the tire are measured in the normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
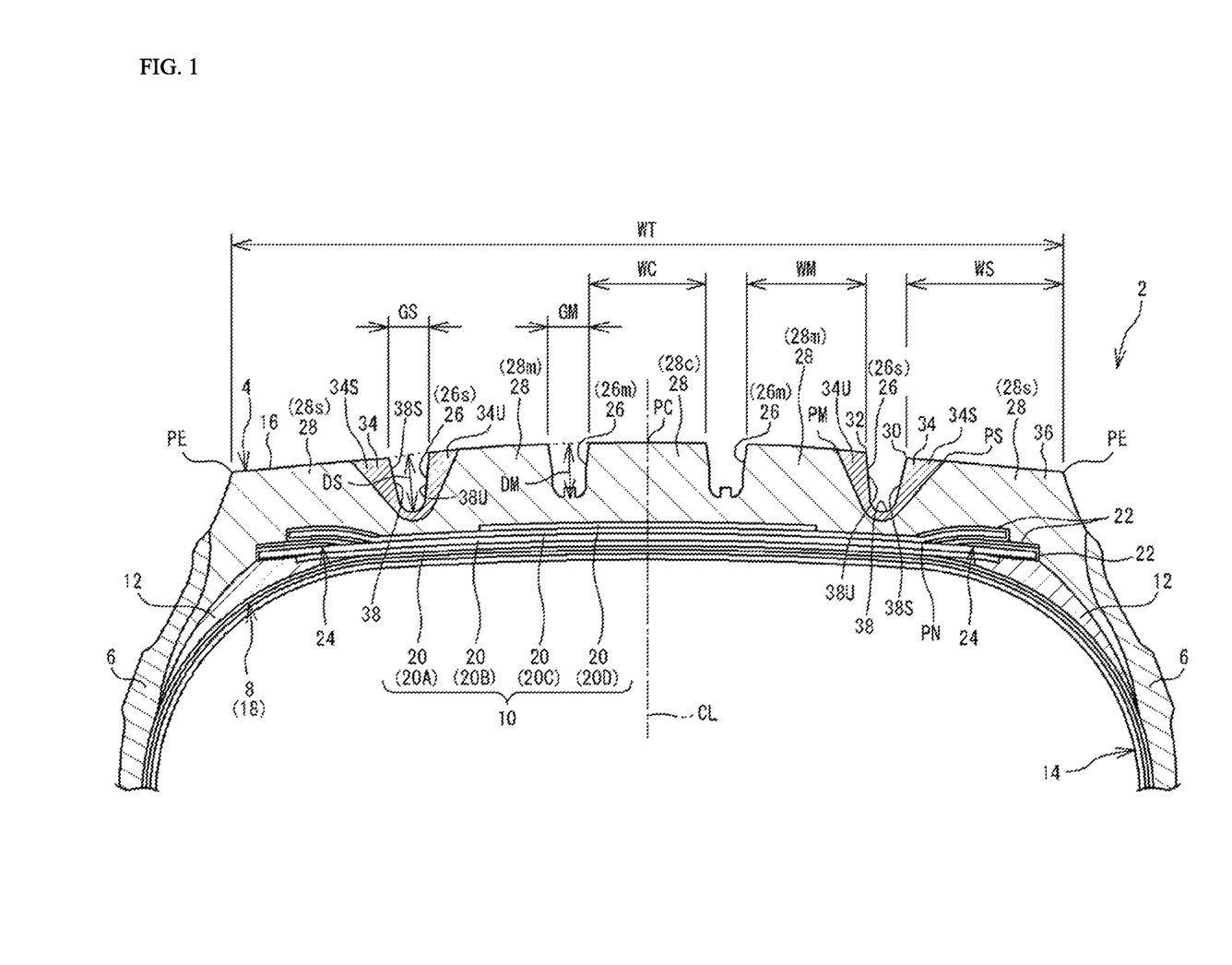
FIG. 1 is a cross-sectional view showing a part of a heavy duty pneumatic tire according to an embodiment of the present invention.

FIG. 1 shows a part of a heavy duty pneumatic tire 2 (hereinafter, sometimes referred to simply as "tire 2") according to an embodiment of the present invention. The tire 2 is mounted to a vehicle such as a truck or a bus.

FIG. 1 shows a part of a cross-section of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line CL represents the equator plane of the tire 2.

The tire 2 includes a tread 4, a pair of sidewalls 6, a pair of beads (not shown), a carcass 8, a belt 10, a pair of cushion layers 12, and an inner liner 14.

The tread 4 comes into contact with a road surface at an outer surface 16 thereof, that is, at a tread surface 16 thereof. The tread 4 has the tread surface 16 that comes into contact with a road surface. Reference character PC represents the point of intersection of the tread surface 16 and the equator plane CL. The point of intersection PC corresponds to the equator of the tire 2.

Reference character PE represents an end of the tread surface 16. In the tire 2, when the ends PE of the tread surface 16 cannot be identified from the appearance, the outer ends in the axial direction of a ground-contact surface obtained when the normal load is applied to the tire 2 in the normal state and the tread 4 is brought into contact with a flat surface at a camber angle of 0° are defined as the ends PE of the tread surface 16.

In FIG. 1, a double-headed arrow WT represents the width in the axial direction of the tread surface 16. The width WT in the axial direction of the tread surface 16 is represented by the distance in the axial direction from one end PE of the tread surface 16 to the other end PE of the tread surface 16.

Each sidewall 6 is connected to an end of the tread 4. The sidewall 6 extends radially inward from the end of the tread 4. The sidewall 6 is formed from a crosslinked rubber.

The carcass 8 is located inward of the tread 4 and each sidewall 6. Although not shown, the carcass 8 extends between and on one bead and the other bead. The carcass 8 has a radial structure. The carcass 8 includes at least one carcass ply 18. The carcass 8 of the tire 2 is composed of one carcass ply 18.

The carcass ply 18 includes a large number of carcass cords aligned with each other, which are not shown. In the tire 2, the material of the carcass cords is steel.

The belt 10 is located radially inward of the tread 4. The belt 10 is located radially outward of the carcass 8. The belt 10 is laminated on the carcass 8.

The belt 10 includes a plurality of layers 20 laminated in the radial direction. The belt 10 of the tire 2 includes four layers 20. In the tire 2, the number of layers 20 included in the belt 10 is not particularly limited. The configuration of the belt 10 is determined as appropriate in consideration of the specifications of the tire 2.

Each of the layers 20 includes a large number of belt cords aligned with each other, which are not shown. Each belt cord is tilted relative to the equator plane CL. The material of the belt cords is steel.

In the tire 2, among the four layers 20, a second layer 20B located between a first layer 20A and a third layer 20C has the maximum width in the axial direction. A fourth layer 20D located on the outermost side in the radial direction has the minimum width in the axial direction.

As shown in FIG. 1, each of end portions of the second layer 20B and the third layer 20C is covered with a rubber layer 22. Furthermore, one rubber layer 22 is disposed between the respective end portions covered with the rubber layers 22. In the tire 2, an edge member 24 including three rubber layers 22 in total is interposed between the end portion of the second layer 20B and the end portion of the third layer 20C. Accordingly, the end portion of the third layer 20C is raised radially outward, and is disposed so as to be separated from the end portion of the second layer 20B. The edge member 24 is formed from a crosslinked rubber.

In FIG. 1, reference character PN represents the inner end of the edge member 24. As described above, the belt 10 includes the plurality of layers 20 laminated in the radial direction. The inner end PN of the edge member 24 is also an end of a contact surface between the second layer 20B and the third layer 20C included in the belt 10.

Each cushion layer 12 is located between the belt 10 and the carcass 8 at a portion of the belt 10 at an end thereof, that is, at an end portion of the belt 10. The cushion layer 12 is formed from a crosslinked rubber.

The inner liner 14 is located inward of the carcass 8. The inner liner 14 forms the inner surface of the tire 2. The inner liner 14 is formed from a crosslinked rubber that has an excellent air blocking property.

The tread 4 of the tire 2 has a plurality of land portions 28 demarcated by grooves 26 continuously extending in the circumferential direction, that is, by circumferential grooves 26. In the tire 2, at least four circumferential grooves 26 aligned in the axial direction are formed on the tread 4. Accordingly, in the tread 4, at least five land portions 28 are formed. In the tire 2 shown in FIG. 1, four circumferential grooves 26 are formed, and five land portions 28 are formed in the tread 4.

Among the four circumferential grooves 26, circumferential grooves 26s located on the outer side in the axial direction, that is, circumferential grooves 26s near the ends PE of the tread surface 16, are shoulder circumferential grooves. Circumferential grooves 26m located axially inward of the shoulder circumferential grooves 26s are middle circumferential grooves. In the tire 2, the four circumferential grooves 26 include a pair of shoulder circumferential grooves 26s and a pair of middle circumferential grooves 26m. In the case where five or more circumferential grooves 26 are formed on the tread 4 of the tire 2 and another circumferential groove is provided axially inward of each middle circumferential groove 26m, the circumferential groove is referred to as a crown circumferential groove.

In FIG. 1, a double-headed arrow GM represents the groove width of the middle circumferential groove 26m. The groove width GM is represented by the shortest distance from one edge of the middle circumferential groove 26m to the other edge of the middle circumferential groove 26m. A double-headed arrow DM represents the depth of the middle circumferential groove 26m. A double-headed arrow GS represents the groove width of the shoulder circumferential groove 26s. The groove width GS is represented by the shortest distance from one edge of the shoulder circumferential groove 26s to the other edge of the shoulder circumferential groove 26s. A double-headed arrow DS represents the depth of the shoulder circumferential groove 26s.

In the tire 2, from the viewpoint of contribution to drainage performance and traction performance, the groove width GM of each middle circumferential groove 26m is preferably 1 to 10% of the width WT in the axial direction of the tread surface 16. The depth DM of each middle circumferential groove 26m is preferably 13 to 25 mm.

In the tire 2, from the viewpoint of contribution to drainage performance and traction performance, the groove width GS of each shoulder circumferential groove 26s is preferably 1 to 10% of the width WT in the axial direction of the tread surface 16. The depth DS of each shoulder circumferential groove 26s is preferably 13 to 25 mm.

As shown in FIG. 1, in the tire 2, each shoulder circumferential groove 26s is located between an end of the fourth layer 20D and an end of the third layer 20C of the belt 10 in the axial direction. The shoulder circumferential groove 26s is located between the end of the fourth layer 20D and the inner end PN of the edge member 24 in the axial direction.

As described above, in the tire 2, the four circumferential grooves 26 are formed on the tread 4, thereby forming the five land portions 28 in the tread 4. The land portions 28 are aligned in the axial direction and extend in the circumferential direction.

Among the five land portions 28, land portions 28s located on the outer side in the axial direction, that is, land portions 28s including the ends PE of the tread surface 16, are shoulder land portions. Land portions 28m located inward of the shoulder land portions 28s in the axial direction are middle land portions. A land portion 28c located inward of the middle land portions 28m in the axial direction is a crown land portion. In the tire 2, the crown land portion 28c is located on the equator PC.

In the tire 2, the five land portions 28 include a crown land portion 28c, a pair of middle land portions 28m, and a pair of shoulder land portions 28s. The middle circumferential groove 26m is present between the crown land portion 28c and each middle land portion 28m. The shoulder circumferential groove 26s is present between each middle land portion 28m and each shoulder land portion 28s.

In the tire 2, the shoulder circumferential grooves 26s are formed on the tread 4, thereby forming the shoulder land portions 28s including the ends PE of the tread surface 16 and the middle land portions 28m located inward of the shoulder land portions 28s in the axial direction. The middle circumferential grooves 26m located inward of the shoulder circumferential grooves 26s in the axial direction and extending in the circumferential direction are further formed on the tread 4, thereby forming the crown land portion 28c located inward of the middle land portions 28m in the axial direction.

In FIG. 1, a double-headed arrow WC represents the width in the axial direction of the crown land portion 28c. The width WC is represented by the distance in the axial direction from one edge of the crown land portion 28c to the other edge of the crown land portion 28c. A double-headed arrow WM represents the width in the axial direction of the middle land portion 28m. The width WM is represented by the distance in the axial direction from one edge of the middle land portion 28m to the other edge of the middle land portion 28m. A double-headed arrow WS represents the width in the axial direction of the shoulder land portion 28s. The width WS is represented by the distance in the axial direction from one edge of the shoulder land portion 28s to the other edge of the shoulder land portion 28s.

In the tire 2, from the viewpoint of steering stability and wet performance, the ratio of the width WM in the axial direction of the middle land portion 28m to the width WC in the axial direction of the crown land portion 28c is preferably not less than 0.9 and preferably not greater than 1.1. The ratio of the width WS in the axial direction of the shoulder land portion 28s to the width WC in the axial direction of the crown land portion 28c is preferably not less than 1.2 and preferably not greater than 1.6.

As shown in FIG. 1, in the tire 2, an inner edge 30 of each shoulder land portion 28s is located inward of the inner end PN of the edge member 24 in the axial direction. An outer edge 32 of each middle land portion 28m is located outward of the end of the fourth layer 20D of the belt 10 in the axial direction.

The tread 4 of the tire 2 is formed from a crosslinked rubber. The tread 4 includes a pair of groove wall portions 34 and a cap portion 36.

The cap portion 36 is located around each groove wall portion 34. As shown in FIG. 1, the cap portion 36 encloses each groove wall portion 34. Although not shown, a base portion is provided radially inward of the cap portion 36 in the tire 2. The tread 4 includes the base portion located radially inward of the cap portion 36. The cap portion 36 is located between the base portion and each groove wall portion 34.

In the tire 2, the cap portion 36 is formed from a crosslinked rubber for which wear resistance and grip performance are taken into consideration. The base portion is formed from a crosslinked rubber having low heat generation properties.

The pair of groove wall portions 34 are disposed so as to be spaced apart from each other in the axial direction. As shown in FIG. 1, each groove wall portion 34 is provided in a portion of the tread 4 at the shoulder circumferential groove 26s. As shown in FIG. 1, a cross-sectional shape of the groove wall portion 34 represented by the boundary between the groove wall portion 34 and the cap portion 36 is tapered inward. In the tire 2, the groove wall portion 34 is not provided in a portion of the tread 4 at each middle circumferential groove 26m.

In the tire 2, each groove wall portion 34 forms a part of the tread surface 16. The cap portion 36 forms the other part of the tread surface 16. The tread surface 16 of the tire 2 is formed by the groove wall portions 34 and the cap portion 36.

Each groove wall portion 34 forms a wall 38 of the shoulder circumferential groove 26s. Of the wall 38 of the shoulder circumferential groove 26s, a wall 38S on the end PE side of the tread surface 16 is an outer wall of the shoulder circumferential groove 26s, and a wall 38U on the equator PC side of the tread surface 16 is an inner wall of the shoulder circumferential groove 26s. Of the groove wall portion 34, a groove wall portion 34S forming the outer wall 38S of the shoulder circumferential groove 26s is an outer groove wall portion, and a groove wall portion 34U forming the inner wall 38U of the shoulder circumferential groove 26s is an inner groove wall portion. The groove wall portion 34 includes the outer groove wall portion 34S and the inner groove wall portion 34U.

As described above, in the tread 4 of the tire 2, the crown land portion 28c, the pair of middle land portions 28m, and the pair of shoulder land portions 28s are formed, and the shoulder circumferential groove 26s is present between each middle land portion 28m and each shoulder land portion 28s.

In the tire 2, each shoulder land portion 28s includes the groove wall portion 34 forming the outer wall 38S of the shoulder circumferential groove 26s, that is, the outer groove wall portion 34S, and a portion of the cap portion 36 that is located outward of the outer groove wall portion 34S in the axial direction. In FIG. 1, reference character PS represents the boundary between the groove wall portion 34 and the cap portion 36 on the outer surface of the shoulder land portion 28s.

In the tire 2, each middle land portion 28m includes the groove wall portion 34 forming the inner wall 38U of the shoulder circumferential groove 26s, that is, the inner groove wall portion 34U, and a portion of the cap portion 36 that is located inward of the inner groove wall portion 34U in the axial direction. In FIG. 1, reference character PM represents the boundary between the groove wall portion 34 and the cap portion 36 on the outer surface of the middle land portion 28m.

Figure 2:
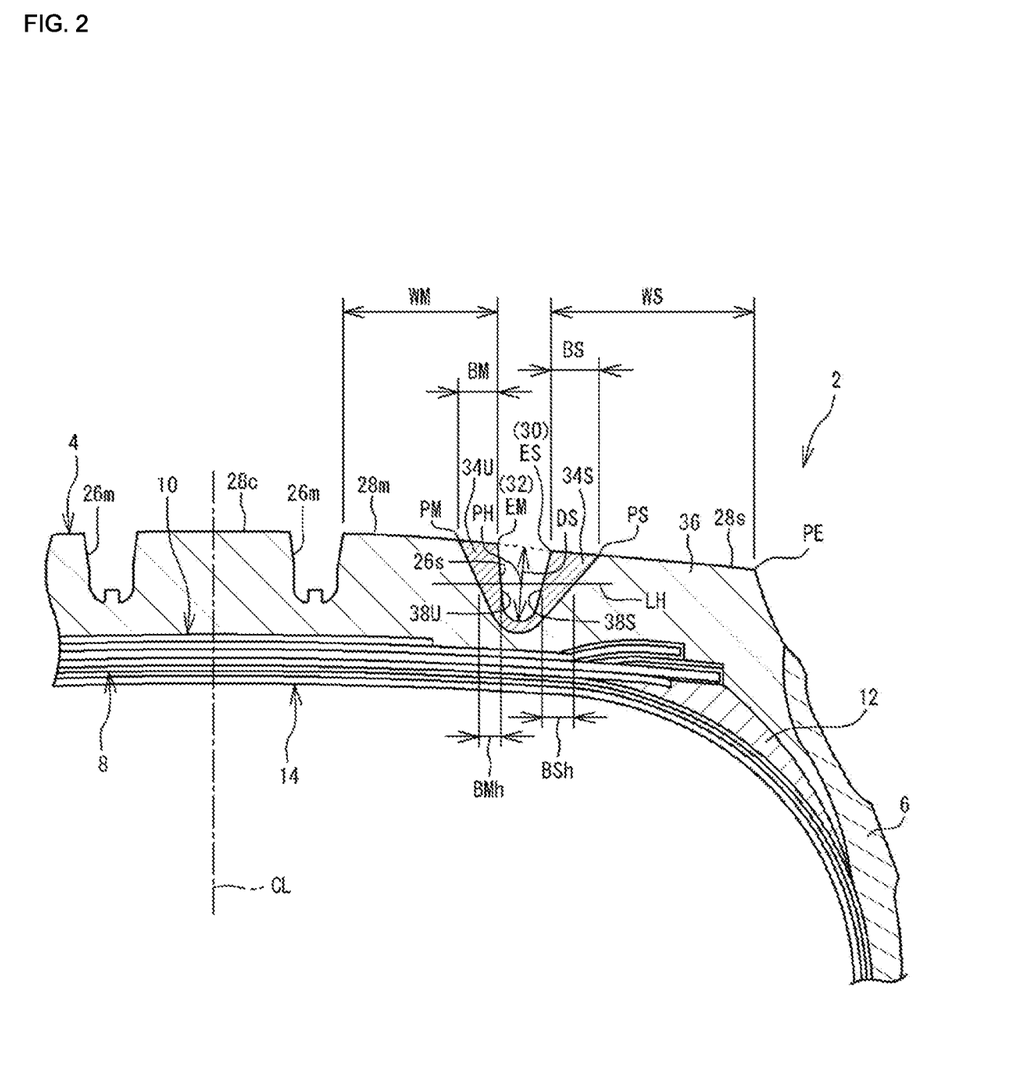
FIG. 2 is a cross-sectional view showing a part of the tire.

FIG. 2 shows a part of the tire 2 shown in FIG. 1. In FIG. 2, the right-left direction is the axial direction of the tire 2, and the up-down direction is the radial direction of the tire 2. The direction perpendicular to the surface of the sheet of FIG. 2 is the circumferential direction of the tire 2.

In FIG. 2, reference character ES represents an end of the outer wall 38S, that is, the outer edge of the shoulder circumferential groove 26s. The outer edge ES is also the inner edge 30 of the shoulder land portion 28s. A double-headed arrow BS represents the distance in the axial direction from the outer edge ES of the shoulder circumferential groove 26s to the boundary PS between the groove wall portion 34 and the cap portion 36 on the outer surface of the shoulder land portion 28s. Reference character EM represents an end of the inner wall 38U, that is, the inner edge of the shoulder circumferential groove 26s. The inner edge EM is also the outer edge 32 of the middle land portion 28m. A double-headed arrow BM represents the distance in the axial direction from the inner edge EM of the shoulder circumferential groove 26s to the boundary PM between the groove wall portion 34 and the cap portion 36 on the outer surface of the middle land portion 28m.

In the tire 2, each groove wall portion 34 is formed from a crosslinked rubber. In the tire 2, regarding wear resistance indexes of the groove wall portion 34 and the cap portion 36, the wear resistance index of the groove wall portion 34 is lower than the wear resistance index of the cap portion 36.

The wear resistance indexes of the groove wall portion 34 and the cap portion 36 are obtained by the improved Lambourn abrasion test specified in JIS K6264-2. In measurement of the wear resistance indexes, test pieces (crosslinked rubbers) are prepared by using a rubber composition for the groove wall portion 34 and a rubber composition for the cap portion 36. The wear resistance index of each test piece is measured, using an improved Lambourn abrasion tester manufactured by Iwamoto Seisakusho, under the conditions of: a test piece surface speed of 40 m/min; a slip rate of 10%; an applied force of 4 kN; and a falling amount of a dusting agent of 20 g per minute.

In each shoulder land portion 28s of the tire 2, the outer groove wall portion 34S is located on the inner edge 30 side thereof, and the cap portion 36 is located outward of the outer groove wall portion 34S in the axial direction. Since the wear resistance index of the groove wall portion 34 is lower than the wear resistance index of the cap portion 36, wear is accelerated at an inner edge 30 portion of the shoulder land portion 28s. Regarding the progress of wear at the shoulder land portion 28s, the progress of wear at the inner edge 30 portion and the progress of wear at the outer edge, that is, an end PE portion of the tread surface 16, are well balanced, and thus the entire shoulder land portion 28s is worn uniformly. In the tire 2, shoulder wear at the shoulder land portion 28s is less likely to occur.

In the tire 2, the ratio (BS/WS) of the distance BS in the axial direction from the outer edge ES of the shoulder circumferential groove 26s to the boundary PS between the groove wall portion 34 and the cap portion 36 on the outer surface of the shoulder land portion 28s, to the width WS in the axial direction of the shoulder land portion 28s, is not less than 20% and not greater than 30%.

Since the ratio (BS/WS) is not less than 20%, the outer groove wall portion 34S can effectively contribute to the progress of wear at the inner edge 30 portion of the shoulder land portion 28s. In the tire 2, occurrence of shoulder wear at the shoulder land portion 28s is inhibited. From this viewpoint, the ratio (BS/WS) is preferably not less than 22%.

Since the ratio (BS/WS) is not greater than 30%, the proportion of the outer groove wall portion 34S to the outer surface of the shoulder land portion 28s is appropriately reduced. In the tire 2, occurrence of excessive wear (also referred to as track wear) at the inner edge 30 portion of the shoulder land portion 28s is inhibited. From this viewpoint, the ratio (BS/WS) is preferably not greater than 28%.

In the tire 2, the entire shoulder land portion 28s is worn uniformly. In the tire 2, occurrence of uneven wear is inhibited. The tire 2 has excellent uneven wear resistance.

In FIG. 2, reference character PH represents the position at which the depth DS of the shoulder circumferential groove 26s is half. A solid line LH is a virtual line extending in the axial direction and passing through the position PH at which the depth DS of the shoulder circumferential groove 26s is half. A double-headed arrow BSh represents the thickness of the outer groove wall portion 34S measured along the virtual line LH. The thickness BSh of the outer groove wall portion 34S is the distance in the axial direction from the wall 38 (that is, the outer wall 38S) of the shoulder circumferential groove 26s to the boundary between the groove wall portion 34 (that is, the outer groove wall portion 34S) and the cap portion 36 at the position PH at which the depth DS of the shoulder circumferential groove 26s is half. A double-headed arrow BMh represents the thickness of the inner groove wall portion 34U measured along the virtual line LH. The thickness BMh of the inner groove wall portion 34U is the distance in the axial direction from the wall 38 (that is, the inner wall 38U) of the shoulder circumferential groove 26s to the boundary between the groove wall portion 34 (that is, the inner groove wall portion 34U) and the cap portion 36 at the position PH at which the depth DS of the shoulder circumferential groove 26s is half.

In the tire 2, the ratio (BSh/WS) of the distance BSh in the axial direction from the outer wall 38S of the shoulder circumferential groove 26s to the boundary between the outer groove wall portion 34S and the cap portion 36 at the position PH at which the depth DS of the shoulder circumferential groove 26s is half, to the width WS in the axial direction of the shoulder land portion 28s, is preferably not less than 10% and preferably not greater than 20%.

When the ratio (BSh/WS) is set so as to be not less than 10%, the volume of the outer groove wall portion 34S at the inner edge 30 portion of the shoulder land portion 28s is effectively ensured. The outer groove wall portion 34S can effectively contribute to the progress of wear at the inner edge 30 portion of the shoulder land portion 28s. In the tire 2, occurrence of shoulder wear at the shoulder land portion 28s is effectively inhibited. From this viewpoint, the ratio (BSh/WS) is more preferably not less than 12%.

When the ratio (BSh/WS) is set so as to be not greater than 20%, the volume of the outer groove wall portion 34S at the inner edge 30 portion of the shoulder land portion 28s is effectively maintained. In the tire 2, occurrence of track wear at the shoulder land portion 28s is also effectively inhibited. From this viewpoint, the ratio (BSh/WS) is more preferably not greater than 18%.

In each middle land portion 28m of the tire 2, the inner groove wall portion 34U is located on the outer edge 32 side thereof, and the cap portion 36 is located inward of the inner groove wall portion 34U in the axial direction. Since the wear resistance index of the groove wall portion 34 is lower than the wear resistance index of the cap portion 36, wear is also accelerated at an outer edge 32 portion of the middle land portion 28m. The outer edge 32 portion of the middle land portion 28m accelerates wear at the inner edge 30 portion of the shoulder land portion 28s. In the shoulder land portion 28s, the progress of wear at the inner edge 30 portion and the progress of wear at the outer edge 32 portion are well balanced, and thus the entire shoulder land portion 28s is worn uniformly. In the tire 2, occurrence of shoulder wear at the shoulder land portion 28s is effectively inhibited. The outer edge 32 portion of the middle land portion 28m contributes to inhibition of occurrence of shoulder wear at the shoulder land portion 28s.

In the tire 2, the ratio (BM/WM) of the distance BM in the axial direction from the inner edge EM of the shoulder circumferential groove 26s to the boundary PM between the groove wall portion 34 and the cap portion 36 on the outer surface of the middle land portion 28m, to the width WM in the axial direction of the middle land portion 28m, is preferably not less than 20% and preferably not greater than 30%.

When the ratio (BM/WM) is set so as to be not less than 20%, the outer edge 32 portion of the middle land portion 28m can effectively contribute to inhibition of occurrence of shoulder wear at the shoulder land portion 28s. From this viewpoint, the ratio (BM/WM) is more preferably not less than 22%. When the ratio (BM/WM) is set so as to be not greater than 30%, occurrence of excessive wear, that is, track wear, at the outer edge 32 portion of the middle land portion 28m is inhibited. From this viewpoint, the ratio (BM/WM) is more preferably not greater than 28%.

In the tire 2, the ratio (BMh/WM) of the distance BMh in the axial direction from the inner wall 38U of the shoulder circumferential groove 26s to the boundary between the groove wall portion 34 and the cap portion 36 at the position PH at which the depth DS of the shoulder circumferential groove 26s is half, to the width WM in the axial direction of the middle land portion 28m, is preferably not less than 10% and preferably not greater than 20%.

When the ratio (BMh/WM) is set so as to be not less than 10%, the outer edge 32 portion of the middle land portion 28m can effectively contribute to inhibition of occurrence of shoulder wear at the shoulder land portion 28s. From this viewpoint, the ratio (BMh/WM) is more preferably not less than 12%. When the ratio (BMh/WM) is set so as to be not greater than 20%, occurrence of track wear at the middle land portion 28m is inhibited. From this viewpoint, the ratio (BMh/WM) is more preferably not greater than 18%.

As described above, in the tire 2, the wear resistance index of the groove wall portion 34 is lower than the wear resistance index of the cap portion 36. Specifically, the ratio of the wear resistance index of the groove wall portion 34 to the wear resistance index of the cap portion 36 is preferably not less than 75% and preferably not greater than 85%.

When the ratio of the wear resistance index of the groove wall portion 34 to the wear resistance index of the cap portion 36 is set so as to be not less than 75%, occurrence of track wear at the shoulder land portion 28s and the middle land portion 28m is effectively inhibited. From this viewpoint, this ratio is more preferably not less than 78%.

When the ratio of the wear resistance index of the groove wall portion 34 to the wear resistance index of the cap portion 36 is set so as to be not less than 85%, wear is accelerated at the inner edge 30 portion of the shoulder land portion 28s. Regarding the progress of wear at the shoulder land portion 28s, the progress of wear at the inner edge 30 portion and the progress of wear at the outer edge 32 portion are well balanced, and thus the entire shoulder land portion 28s is worn uniformly. In the tire 2, shoulder wear at the shoulder land portion 28s is less likely to occur. From this viewpoint, this ratio is more preferably not greater than 83%.

Figure 3:
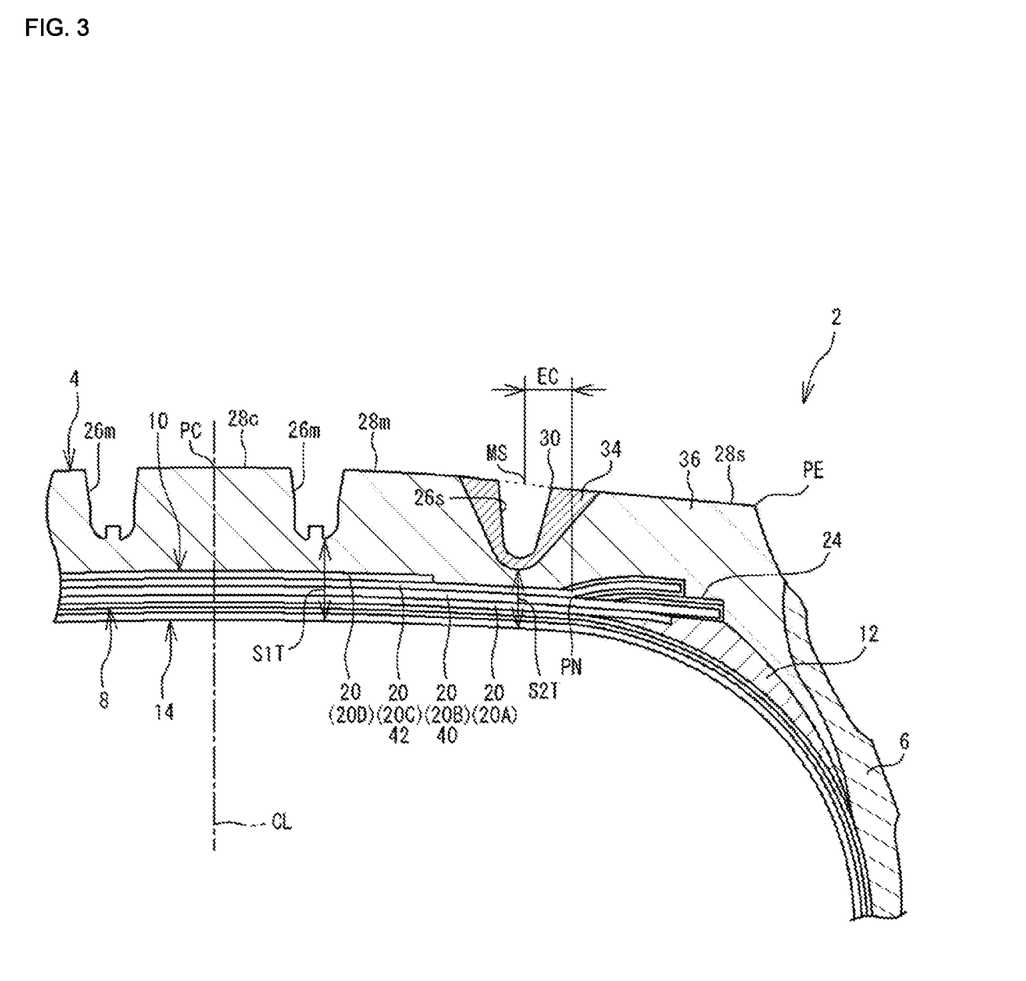
FIG. 3 is a cross-sectional view showing a part of the tire.

FIG. 3 shows a part of the tire 2 shown in FIG. 1. In FIG. 3, the right-left direction is the axial direction of the tire 2, and the up-down direction is the radial direction of the tire 2. The direction perpendicular to the surface of the sheet of FIG. 3 is the circumferential direction of the tire 2.

In FIG. 3, a double-headed arrow S1T represents the thickness of the tire 2 at the bottom of the middle circumferential groove 26m. A double-headed arrow S2T represents the thickness of the tire 2 at the bottom of the shoulder circumferential groove 26s.

In the tire 2, the ratio (S1T/S2T) of the thickness S1T of the tire 2 at the bottom of the middle circumferential groove 26m to the thickness S2T of the tire 2 at the bottom of the shoulder circumferential groove 26s is preferably not less than 1.0 and preferably not greater than 1.3.

When the ratio (S1T/S2T) is set so as to be not less than 1.0, a decrease in contact pressure around the shoulder circumferential groove 26s is inhibited. In the tire 2, occurrence of track wear at the shoulder land portion 28s and the middle land portion 28m is effectively inhibited. From this viewpoint, the ratio (S1T/S2T) is more preferably not less than 1.1. When the ratio (S1T/S2T) is set so as to be not greater than 1.3, an amount of lifting of the equator PC due to inflation, which will be described later, is ensured. The difference between the amount of lifting of the equator PC and an amount of lifting of the inner edge 30 of the shoulder land portion 28s is inhibited from excessively increasing. Thus, in the tire 2, occurrence of shoulder wear at the shoulder land portion 28s is effectively inhibited. From this viewpoint, the ratio (S1T/S2T) is more preferably not greater than 1.2.

In the tire 2, among the plurality of layers 20 included in the belt 10, the layer 20 having the largest width in the axial direction is also referred to as a first reference layer 40, and the layer 20 laminated on the outer side of the first reference layer 40 is also referred to as a second reference layer 42. In the tire 2, the second layer 20B having the largest width in the axial direction is the first reference layer 40, and the third layer 20C laminated on the outer side of the second layer 20B in the radial direction is the second reference layer 42. The plurality of layers 20 included in the belt 10 include the first reference layer 40 having the largest width in the axial direction and the second reference layer 42 laminated on the outer side of the first reference layer 40 in the radial direction. The above-described inner end PN of the edge member 24 is an end of a contact surface between the first reference layer 40 and the second reference layer 42.

In FIG. 3, reference character MS represents the center of the groove width GS of the shoulder circumferential groove 26s. A double-headed arrow EC represents the distance in the axial direction from the end PN of the contact surface between the first reference layer 40 and the second reference layer 42 to the center MS of the groove width GS of the shoulder circumferential groove 26s.

In the tire 2, the end PN of the contact surface between the first reference layer 40 and the second reference layer 42 is located between an end of the second reference layer 42 and the center MS of the groove width GS of the shoulder circumferential groove 26s in the axial direction, and the distance EC in the axial direction from the end PN of the contact surface to the center MS of the groove width GS of the shoulder circumferential groove 26s is preferably not less than 5 mm. Accordingly, in the tire 2, the amount of lifting of the inner edge 30 of the shoulder land portion 28s due to inflation, which will be described later, is appropriately maintained, and thus occurrence of shoulder wear at the shoulder land portion 28s is effectively inhibited. From this viewpoint, the distance EC in the axial direction is more preferably not less than 7 mm. From the viewpoint of inhibiting occurrence of damage at the end portion of the belt 10, the distance EC in the axial direction is preferably not greater than 15 mm.

Figure 4:
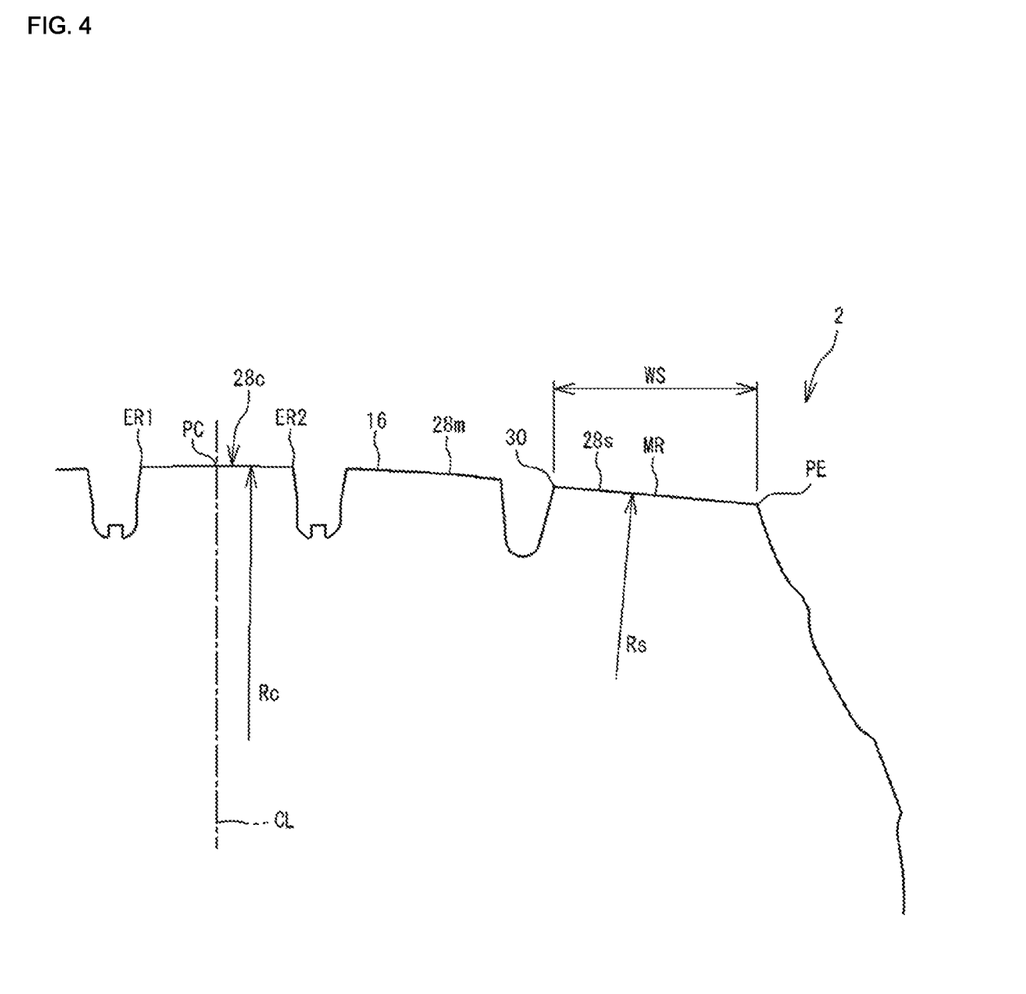
FIG. 4 is a cross-sectional view showing a part of the outer surface shape of the tire.

FIG. 4 shows a part of the tire 2 shown in FIG. 1. In FIG. 4, a part of the outer surface shape of the tire 2 is shown. In FIG. 4, the right-left direction is the axial direction of the tire 2, and the up-down direction is the radial direction of the tire 2. The direction perpendicular to the surface of the sheet of FIG. 4 is the circumferential direction of the tire 2.

In FIG. 4, reference character ER1 represents one edge of the outer surface of the crown land portion 28c, and reference character ER2 represents the other edge of the outer surface of the crown land portion 28c. Reference character MR represents the position, on the outer surface, at which the width WS in the axial direction of the shoulder land portion 28s is half. The position MR is the outer surface center of the shoulder land portion 28s.

The shape of the tread surface 16 of the tire 2 is represented by a plurality of circular arcs. In FIG. 4, an arrow Rc represents the radius of a circular arc representing the outer surface shape of the crown land portion 28c. An arrow Rs represents the radius of a circular arc representing the outer surface shape of the shoulder land portion 28s. To specify the radius Rc and the radius Rs which will be described below, an outer surface profile of the tire 2 in the normal state, which is measured using a tire profile measuring device having a laser displacement meter, is used.

In the tire 2, the radius Rc of the circular arc representing the outer surface shape of the crown land portion 28c is specified as follows. First, a virtual circular arc (hereinafter, also referred to as a first virtual circular arc) passing through the equator PC and the edge ER1 and the edge ER2 of the outer surface of the crown land portion 28c is drawn. Between the edge ER1 and the edge ER2 of the crown land portion 28c, the deviation between the locus represented by the first virtual circular arc and the outer surface of the crown land portion 28c is measured along a line normal to the first virtual circular arc. When this deviation is within 3% of the length of the first virtual circular arc connecting the edge ER1 and the edge ER2 of the crown land portion 28c, the radius of the first virtual circular arc is specified as the radius Rc of the circular arc representing the outer surface shape of the crown land portion 28c. In the case where a circumferential groove is formed on the equator PC, the radius Rc of the circular arc representing the outer surface shape of the crown land portion 28c is specified on the basis of a total of four edges of two crown land portions located on both sides of the circumferential groove on the equator PC.

In the tire 2, the radius Rs of the circular arc representing the outer surface shape of the shoulder land portion 28s is specified as follows. First, a virtual circular arc (hereinafter, also referred to as a second virtual circular arc) passing through the inner edge 30 of the shoulder land portion 28s, the outer surface center MR of the shoulder land portion 28s, and the end PE of the tread surface 16 (the outer edge of the shoulder land portion 28s) is drawn. Between the inner edge 30 of the shoulder land portion 28s and the end PE of the tread surface 16, the deviation between the locus represented by the second virtual circular arc and the outer surface of the shoulder land portion 28s is measured along a line normal to the second virtual circular arc. When this deviation is within 3% of the length of the second virtual circular arc connecting the inner edge 30 of the shoulder land portion 28s and the end PE of the tread surface 16, the radius of the second virtual circular arc is specified as the radius Rs of the circular arc representing the outer surface shape of the shoulder land portion 28s.

In the tire 2, the ratio (Rc/Rs) of the radius Rc of the circular arc representing the outer surface shape of the crown land portion 28c, to the radius Rs of the circular arc representing the outer surface shape of the shoulder land portion 28s, is preferably not less than 1.7 and preferably not greater than 2.3. Accordingly, in the tire 2, occurrence of uneven wear is inhibited while good running performance is maintained. From the same viewpoint, the radius Rc of the circular arc representing the outer surface shape of the crown land portion 28c is preferably not less than 500 mm and preferably not greater than 1000 mm.

As is obvious from the above description, in the heavy duty pneumatic tire according to the present invention, the entire shoulder land portion is worn uniformly. In this tire, occurrence of uneven wear is inhibited. According to the present invention, a tire having excellent uneven wear resistance is obtained. In particular, the present invention exhibits a more remarkable effect in a tubeless type heavy duty pneumatic tire having a flatness ratio of 70% or less. The "nominal aspect ratio" is a "nominal aspect ratio" included in the "tyre size" specified in JIS D4202 "Automobile tyres-Designation and dimensions".

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

Hereinafter, the present invention will be described in further detail by means of examples, etc., but the present invention is not limited to these examples.

Example 1

A heavy duty pneumatic tire (tire size=275/70R22.5) having the structure shown in FIG. 1 and having specifications shown in Table 1 below was obtained.

In Example 1, the ratio (WS/WT) of the width WS in the axial direction of the shoulder land portion to the width WT in the axial direction of the tread surface was 19%.

The ratio (AW/AC) of a wear resistance index AW of the groove wall portion to a wear resistance index AC of the cap portion was 80%.

The ratio (BS/WS) of the distance BS in the axial direction from the outer edge ES of the shoulder circumferential groove to the boundary between the groove wall portion and the cap portion on the outer surface of the shoulder land portion, to the width WS in the axial direction of the shoulder land portion, was 25%.

The ratio (BSh/WS) of the distance BSh in the axial direction from the outer wall of the shoulder circumferential groove to the boundary between the groove wall portion and the cap portion at the position PH at which the depth DS of the shoulder circumferential groove is half, to the width WS in the axial direction of the shoulder land portion, was 15%.

The ratio (BM/WM) of the distance BM in the axial direction from the inner edge EM of the shoulder circumferential groove to the boundary PM between the groove wall portion and the cap portion on the outer surface of the middle land portion, to the width WM in the axial direction of the middle land portion, was 25%.

The ratio (BMh/WM) of the distance BMh in the axial direction from the inner wall of the shoulder circumferential groove to the boundary between the groove wall portion and the cap portion at the position PH at which the depth DS of the shoulder circumferential groove is half, to the width WM in the axial direction of the middle land portion, was 15%.

The ratio (S1T/S2T) of the thickness S1T of the tire at the bottom of the middle circumferential groove to the thickness S2T of the tire at the bottom of the shoulder circumferential groove was 1.15.

The distance EC in the axial direction from the end PN of the contact surface to the center MS of the groove width of the shoulder circumferential groove was 10 mm.

The ratio (Rc/Rs) of the radius Rc of the circular arc representing the outer surface shape of the crown land portion, to the radius Rs of the circular arc representing the outer surface shape of the shoulder land portion, was 2.00. The radius Rc was 1000 mm.

Example 2 and Comparative Example 1

In Example 2 and Comparative Example 1, the ratio (WS/WT), the ratio (BS/WS), the ratio (BSh/WS), the ratio (BM/WM), the ratio (BMh/WM), and the distance EC were set as shown in Table 1 below. The others were set so as to be the same as in Example 1.

Example 3 and Comparative Example 2

In Example 3 and Comparative Example 2, the ratio (WS/WT), the ratio (BS/WS), the ratio (BSh/WS), the ratio (BM/WM), and the ratio (BMh/WM) were set as shown in Table 1 below. The others were set so as to be the same as in Example 1.

Examples 4 and 5

In Examples 4 and 5, the ratio (WS/WT), the ratio (BS/WS), the ratio (BSh/WS), the ratio (BM/WM), the ratio (BMh/WM), and the ratio (S1T/S2T) were set as shown in Table 2 below. The others were set so as to be the same as in Example 1.

Comparative Examples 3 and 4

In Comparative Examples 3 and 4, no groove wall portions were provided in the tread. Tires of Comparative Examples 3 and 4 are conventional tires. In Comparative Example 3, the ratio (S1T/S2T) and the distance EC were set as shown in Table 2 below. In Comparative Example 4, the distance EC, the radius Rc, and the ratio (Rc/Rs) were set as shown in Table 2 below. The others were set so as to be the same as in Example 1.

[Uneven Wear Resistance Evaluation (Appearance State)]

A test tire was fitted onto a normal rim and inflated with air to adjust the internal pressure of the tire to 850 kPa. This tire was mounted to a front wheel of a test vehicle (low-floor bus). This test vehicle was run on an ordinary road, and uneven wear resistance was evaluated. First, after running for 15,000 km, a radius $Rc_1$ of the circular arc representing the outer surface shape of the crown land portion of the tire and a radius $Rs_1$ of the circular arc representing the outer surface shape of the shoulder land portion were measured, and the ratio ($Rc_1/Rs_1$) was obtained. Next, after running for 30,000 km, a radius $Rc_2$ of the circular arc representing the outer surface shape of the crown land portion of the tire and a radius $Rs_2$ of the circular arc representing the outer surface shape of the shoulder land portion were measured, and the ratio ($Rc_2/Rs_2$) was obtained. The results are shown in Tables 1 and 2 below.

In this evaluation, the wear state of the tire was also visually observed. The results are shown in Tables 1 and 2 below with the following ratings.

EVEN: The entire shoulder land portion was worn uniformly.

CR: The entire tread surface was worn so that it had an outward convex shape, but the entire shoulder land portion was worn almost uniformly.

LSD: The wear was a little like shoulder wear, but the shoulder land portion was almost uniformly worn.

SD: Shoulder wear had occurred.

RSD: Shoulder wear had significantly occurred.

OB: Track wear had occurred at the inner edge of the shoulder land portion.

[Uneven Wear Resistance Evaluation (Wear Life)]

A test tire was fitted onto a normal rim and inflated with air to adjust the internal pressure of the tire to 850 kPa. This tire was mounted to a front wheel of a test vehicle (low-floor bus). This test vehicle was run on an ordinary road, and the running distance until the tire was replaced with a new tire was measured. The results are shown as indexes in Tables 1 and 2 below. A higher value represents that uneven wear is less likely to occur and the uneven wear resistance is better.

TABLE 1

|  | Comparative Example 1 | Example 2 | Example 1 | Example 3 | Comparative Example 2 |
|---|---|---|---|---|---|
| WS/WT [%] | 16 | 16 | 19 | 22 | 22 |
| AW/AC [%] | 80 | 80 | 80 | 80 | 80 |
| BS/WS [%] | 15 | 20 | 25 | 30 | 35 |
| BSh/WS [%] | 9 | 12 | 15 | 18 | 21 |
| BM/WM [%] | 15 | 20 | 25 | 30 | 35 |
| BMh/WM [%] | 9 | 12 | 15 | 18 | 21 |
| S1T/S2T [—] | 1.15 | 1.15 | 1.15 | 1.15 | 1.15 |
| EC [mm] | 5 | 5 | 10 | 10 | 10 |
| Rc [mm] | 1000 | 1000 | 1000 | 1000 | 1000 |
| Rc/Rs [—] | 2.00 | 2.00 | 2.00 | 2.00 | 2.00 |
| $Rc_1$ [mm] | 1000 | 950 | 900 | 750 | 800 |
| $Rc_1/Rs_1$ [—] | 2.08 | 1.83 | 1.64 | 1.25 | 1.33 |
| $Rc_2$ [mm] | 1000 | 900 | 800 | 600 | — |
| $Rc_2/Rs_2$ [—] | 2.22 | 1.64 | 1.33 | 0.86 | — |
| State | RSD | LSD | EVEN | CR | OB |
| Wear life | 125 | 140 | 180 | 150 | 115 |

TABLE 2

|  | Example 4 | Example 5 | Comparative Example 3 | Comparative Example 4 |
|---|---|---|---|---|
| WS/WT [%] | 16 | 22 | 19 | 19 |
| AW/AC [%] | 80 | 80 | — | — |
| BS/WS [%] | 20 | 30 | — | — |
| BSh/WS [%] | 12 | 18 | — | — |
| BM/WM [%] | 20 | 30 | — | — |
| BMh/WM [%] | 12 | 18 | — | — |
| S1T/S2T [—] | 1.00 | 1.30 | 0.90 | 1.15 |
| EC [mm] | 10 | 10 | 0 | 0 |
| Rc [mm] | 1000 | 1000 | 1000 | 800 |
| Rc/Rs [—] | 2.00 | 2.00 | 2.00 | 1.45 |
| $Rc_1$ [mm] | 950 | 750 | 1000 | 900 |
| $Rc_1/Rs_1$ [—] | 1.83 | 1.25 | 2.22 | 1.80 |
| $Rc_2$ [mm] | 900 | 600 | 1200 | 1000 |
| $Rc_2/Rs_2$ [—] | 1.64 | 0.86 | 3.00 | 2.22 |
| State | LSD | CR | RSD | SD |
| Wear life | 140 | 150 | 100 | 125 |

As shown in Tables 1 and 2, in the Examples, the entire shoulder land portion was worn uniformly, and occurrence of uneven wear was inhibited. From the evaluation results, advantages of the present invention are clear.

The above-described technology for achieving improvement of uneven wear resistance can be applied to various tires.

What is claimed is:

1. A heavy duty pneumatic tire comprising:
   a tread having a tread surface that comes into contact with a road surface; and
   a belt located radially inward of the tread, wherein
   shoulder circumferential grooves extending in a circumferential direction are formed on the tread, thereby forming shoulder land portions each including an end of the tread surface and middle land portions located inward of the shoulder land portions in an axial direction,
   each of the shoulder land portions includes a groove wall portion forming a wall of the shoulder circumferential groove, and a cap portion located outward of the groove wall portion in the axial direction,
   wherein wear resistance indexes of the groove wall portion and the cap portion are obtained by an improved Lambourn abrasion test specified in JIS K6264-2, and the wear resistance index of the groove wall portion is lower than the wear resistance index of the cap portion,
   a ratio of a distance in the axial direction from an outer edge of the shoulder circumferential groove to a boundary between the groove wall portion and the cap portion on an outer surface of the shoulder land portion, to a width in the axial direction of the shoulder land portion, is not less than 20% and not greater than 30%, and
   the distance in the axial direction from the outer edge of the shoulder circumferential groove to the boundary between the groove wall portion and the cap portion increases from a bottom of the shoulder circumferential groove to a top of the shoulder circumferential groove.

2. The heavy duty pneumatic tire according to claim 1, wherein a ratio of a distance in the axial direction from a wall of the shoulder circumferential groove to the boundary between the groove wall portion and the cap portion at a position at which a depth of the shoulder circumferential groove is half, to the width in the axial direction of the shoulder land portion, is not less than 10% and not greater than 20%.

3. The heavy duty pneumatic tire according to claim 1, wherein a ratio of the wear resistance index of the groove wall portion to the wear resistance index of the cap portion is not less than 75% and not greater than 85%.

4. The heavy duty pneumatic tire according to claim 1, wherein
   the belt includes a plurality of layers laminated in a radial direction,
   the layers include a first reference layer having a largest width in the axial direction, and a second reference layer laminated on an outer side of the first reference layer in the radial direction,
   an end of a contact surface between the first reference layer and the second reference layer is located between an end of the second reference layer and a center of a groove width of the shoulder circumferential groove in the axial direction, and
   a distance in the axial direction from the end of the contact surface to the center of the groove width of the shoulder circumferential groove is not less than 5 mm.

5. The heavy duty pneumatic tire according to claim 1, wherein a ratio of the width in the axial direction of the shoulder land portion to a width in the axial direction of the tread surface is not less than 16% and not greater than 22%.

6. The heavy duty pneumatic tire according to claim 1, wherein the tire has a nominal aspect ratio of 70% or less.

7. The heavy duty pneumatic tire according to claim 1, wherein a groove width of each shoulder circumferential groove is 1% to 10% of a width in the axial direction of the tread surface.

8. The heavy duty pneumatic tire according to claim 1, wherein the ratio of the distance in the axial direction from the outer edge of the shoulder circumferential groove to the boundary between the groove wall portion and the cap portion on the outer surface of the shoulder land portion, to the width in the axial direction of the shoulder land portion, is not less than 22% and not greater than 28%.

9. The heavy duty pneumatic tire according to claim 1, wherein
   a middle circumferential groove located inward of each shoulder circumferential groove in the axial direction and extending in the circumferential direction is formed on the tread, thereby forming a crown land portion located inward of the middle land portion in the axial direction, and
   a ratio of a thickness of the tire at a bottom of the middle circumferential groove to a thickness of the tire at a bottom of the shoulder circumferential groove is not less than 1.0 and not greater than 1.3.

10. The heavy duty pneumatic tire according to claim 9, wherein
   an outer surface shape of the crown land portion is represented by a circular arc having a radius Rc, and an outer surface shape of the shoulder land portion is represented by a circular arc having a radius Rs, and
   a ratio of the radius Rc of the circular arc representing the outer surface shape of the crown land portion, to the radius Rs of the circular arc representing the outer surface shape of the shoulder land portion, is not less than 1.7 and not greater than 2.3.

11. The heavy duty pneumatic tire according to claim 9, wherein a ratio of a width in the axial direction of the middle land portion to a width in the axial direction of the crown land portion is not less than 0.9 and not greater than 1.1.

12. The heavy duty pneumatic tire according to claim 9, wherein a ratio of the width in the axial direction of the shoulder land portion to a width in the axial direction of the crown land portion is not less than 1.2 and not greater than 1.6.

* * * * *